United States Patent
Kubala

(10) Patent No.: US 7,833,947 B1
(45) Date of Patent: Nov. 16, 2010

(54) METHOD FOR TREATMENT OF A WELL USING HIGH SOLID CONTENT FLUID DELIVERY

(75) Inventor: Gregory Kubala, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 37 days.

(21) Appl. No.: 12/491,360

(22) Filed: Jun. 25, 2009

(51) Int. Cl.
*C09K 8/68* (2006.01)
*E21B 43/16* (2006.01)
*E21B 43/26* (2006.01)
*B01F 3/12* (2006.01)

(52) U.S. Cl. .................... 507/200; 166/305.1; 507/203; 507/269; 516/31

(58) Field of Classification Search ................ 507/200, 507/203, 269; 166/305.1; 516/31, 77
See application file for complete search history.

(56) References Cited

U.S. PATENT DOCUMENTS

| | | | |
|---|---|---|---|
| 4,051,900 A | 10/1977 | Hankins |
| 4,387,769 A | 6/1983 | Erbstoesser et al. |
| 4,506,734 A | 3/1985 | Nolte |
| 4,526,695 A | 7/1985 | Erbstoesser et al. |
| 4,670,166 A | 6/1987 | McDougall et al. |
| 4,738,897 A | 4/1988 | McDougall et al. |
| 4,968,353 A | 11/1990 | Kawasaki et al. |
| 4,968,354 A | 11/1990 | Nishiura et al. |
| 5,188,837 A | 2/1993 | Domb |
| 5,518,996 A | 5/1996 | Maroy et al. |
| 5,713,416 A | 2/1998 | Chatterji et al. |
| 5,741,758 A | 4/1998 | Pakulski |
| 5,893,416 A | 4/1999 | Read |
| 5,922,652 A | 7/1999 | Kowalski et al. |
| 5,964,291 A | 10/1999 | Bourne et al. |
| 5,979,557 A | 11/1999 | Card et al. |
| 6,209,643 B1 | 4/2001 | Nguyen et al. |
| 6,209,646 B1 | 4/2001 | Reddy et al. |
| 6,279,656 B1 | 8/2001 | Sinclair et al. |
| 6,326,335 B1 | 12/2001 | Kowalski et al. |
| 6,380,136 B1 | 4/2002 | Bates et al. |
| 6,435,277 B1 | 8/2002 | Qu et al. |
| 6,482,517 B1 | 11/2002 | Anderson |
| 6,599,863 B1 | 7/2003 | Palmer et al. |
| 6,656,265 B1 | 12/2003 | Garnier et al. |
| 6,723,683 B2 | 4/2004 | Crossman et al. |
| 6,874,578 B1 | 4/2005 | Garnier et al. |
| 6,989,195 B2 | 1/2006 | Anderson |
| 7,044,220 B2 | 5/2006 | Nguyen et al. |
| 7,049,272 B2 | 5/2006 | Sinclair et al. |
| 7,084,095 B2 | 8/2006 | Lee et al. |
| 7,166,560 B2 | 1/2007 | Still et al. |
| 7,219,731 B2 | 5/2007 | Sullivan et al. |
| 7,237,610 B1 | 7/2007 | Saini et al. |
| 7,265,079 B2 | 9/2007 | Willberg et al. |
| 7,419,937 B2 | 9/2008 | Rimmer et al. |
| 7,482,311 B2 | 1/2009 | Willberg et al. |
| 7,559,369 B2 | 7/2009 | Roddy et al. |
| 2004/0060702 A1 | 4/2004 | Kotlar et al. |
| 2004/0074646 A1 | 4/2004 | Kotlar et al. |
| 2004/0261995 A1 | 12/2004 | Nguyen et al. |
| 2004/0261996 A1 | 12/2004 | Munoz, Jr. et al. |
| 2005/0130845 A1 | 6/2005 | Freeman et al. |
| 2005/0161220 A1 | 7/2005 | Todd et al. |
| 2005/0233895 A1 | 10/2005 | Mertens et al. |
| 2006/0052251 A1 | 3/2006 | Anderson et al. |
| 2006/0124302 A1 | 6/2006 | Gupta et al. |
| 2006/0175059 A1 | 8/2006 | Sinclair et al. |
| 2007/0238623 A1 | 10/2007 | Saini et al. |
| 2009/0025932 A1 | 1/2009 | Panga et al. |
| 2009/0025934 A1 | 1/2009 | Hartman et al. |

FOREIGN PATENT DOCUMENTS

| | | |
|---|---|---|
| EP | 1236701 | 2/2001 |
| GB | 2277543 | 11/1994 |
| WO | 2004038176 | 5/2004 |

*Primary Examiner*—Timothy J. Kugel
(74) *Attorney, Agent, or Firm*—Marcin Rzaniak; David Cate; Robin Nava

(57) ABSTRACT

The invention discloses a method of delivering a first chemical component to a subterranean formation in a wellbore comprising: providing a fluid comprising a carrier fluid and at least two different sizes of solid particulate materials selected from a group consisting of: very large particles, large particles, medium particles, fine particles, very fine particles and ultrafine particles; wherein the packed volume fraction (PVF) of the two sizes of solid particulate materials exceeds 0.80, and wherein first type of solid particulate materials contains the first chemical component able to be released by a first downhole trigger and second type of solid particulate materials contains the first chemical component or a second chemical component able to be released by a second downhole trigger; pumping the fluid into the wellbore; allowing the first chemical component to be released by the first downhole trigger.

24 Claims, No Drawings

METHOD FOR TREATMENT OF A WELL USING HIGH SOLID CONTENT FLUID DELIVERY

FIELD OF THE INVENTION

The invention relates to the delivery of one or a plurality of chemical components in a subterranean well. More particularly, this invention relates to a delivery method using high solid content fluid for facilitating the delivery of at least a plurality of chemical components to subterranean well bores.

BACKGROUND

The statements in this section merely provide background information related to the present disclosure and may not constitute prior art.

In typical wellbore operations, various treatment fluids may be pumped into the well and eventually into the formation to restore or enhance the productivity of the well. For example, a reactive or non-reactive "fracturing fluid" or a "frac fluid" may be pumped into the wellbore to initiate and propagate fractures in the formation thus providing flow channels to facilitate movement of the hydrocarbons to the wellbore so that the hydrocarbons may be pumped from the well. In such fracturing operations, the fracturing fluid is hydraulically injected into a wellbore penetrating the subterranean formation and is forced against the formation strata by pressure. The formation strata are forced to crack and fracture, and a proppant is placed in the fracture by movement of a viscous-fluid containing proppant into the crack in the rock. The resulting fracture, with proppant in place, provides improved flow of the recoverable fluid (i.e., oil, gas or water) into the wellbore. In another example, a reactive stimulation fluid or "acid" may be injected into the formation. Acidizing treatment of the formation results in dissolving materials in the pore spaces of the formation to enhance production flow. It is common in all these types of operations to add further chemical components to treat the formation. In the case of proppant, scale inhibitors, filter cake remover, surfactant, gas hydrate inhibitors and other chemicals may be used.

To deliver and transport said chemical components downhole in the well, various well-known methods of providing or facilitating the delivery of chemicals are used. However, none of said methods allows an achievable controlled or sustained delivery of chemical components. Effectively, if slow or instantaneous release of chemical components downhole is well-known and achievable mostly of the time. Prior art solutions to deliver chemistry downhole in a sustained or controlled way are not optimum.

In parallel, optimized packing volume fraction has been used in past years for well cementing compositions to improve pumping abilities. Even if application for pumping other well treatment fluids was sought as that time too, commercial use was absent or limited. More recently, concept of optimized packing volume fraction has been used.

SUMMARY OF THE INVENTION

In a first aspect of the invention, a method of treating a subterranean formation in a wellbore is disclosed. The method includes providing a fluid including a carrier fluid and at least two different sizes of solid particulate materials selected from (i) very large particles having a particle size greater than 1 mm; (ii) large particles having a particle size of from about 200-800 µm; (iii) medium particles having a particle size of from about 10-20 µm; (iv) fine particles having a particle size of from about 0.5-10 µm; (v) very fine particles having a particle size of from about 0.05-0.5 µm, and (vi) ultrafine particles having a particle size of from about 7-50 nm, wherein the packed volume fraction (PVF) of the two sizes of solid particulate materials exceeds 0.80, and where first type of solid particulate materials contains a first treating component and second type of solid particulate materials contains a first chemical component able to be released by a first downhole trigger; pumping the fluid into the wellbore to treat the formation; allowing the first chemical component to be released by the downhole trigger.

In one embodiment, the carrier fluid may have a low amount of a viscosifier. And the method may further include the step of fracturing the formation with the carrier fluid. The first treating component may be selected from proppant, fluid loss agent, and combinations thereof. And the first chemical component may be selected from breakers, anti-oxidants, crosslinkers, corrosion inhibitors, delay agents, biocides, buffers, fluid loss additives, pH control agents, solid acids, solid acid precursors, organic scale inhibitors, inorganic scale inhibitors, demulsifying agents, paraffin inhibitors, corrosion inhibitors, gas hydrate inhibitors, asphaltene treating chemicals, foaming agents, surfactant, fluid loss agents, water blocking agents, EOR enhancing agents and combinations thereof.

In another embodiment, the method further includes a third type of solid particulate materials. The third type of solid particulate materials may contain, the first treating component, a second treating component, the first chemical component, or a second chemical component. The second treating component may be selected from proppant, fluid loss agent, and combinations thereof. The second chemical component may be selected from breakers, anti-oxidants, crosslinkers, corrosion inhibitors, delay agents, biocides, buffers, fluid loss additives, pH control agents, solid acids, solid acid precursors, organic scale inhibitors, inorganic scale inhibitors, demulsifying agents, paraffin inhibitors, corrosion inhibitors, gas hydrate inhibitors, asphaltene treating chemicals, foaming agents, surfactant, fluid loss agents, water blocking agents, EOR enhancing agents and combinations thereof. The second chemical component is able to be released by a second downhole trigger.

In another aspect, a method of delivering a first chemical component to a subterranean formation in a wellbore is disclosed. The method includesi: —providing a fluid containing a carrier fluid and at least two different sizes of solid particulate materials selected from: (i) very large particles having a particle size greater than 1 mm; (ii) large particles having a particle size of from about 200-800 µm; (iii) medium particles having a particle size of from about 10-20 µm; (iv) fine particles having a particle size of from about 0.5-10 µm; (v) very fine particles having a particle size of from about 0.05-0.5 µm, and (vi) ultrafine particles having a particle size of from about 7-50 nm, where the packed volume fraction (PVF) of the two sizes of solid particulate materials exceeds 0.80, and wherein first type of solid particulate materials contains the first chemical component able to be released by a first downhole trigger and second type of solid particulate materials contains the first chemical component or a second chemical component able to be released by a second downhole trigger; pumping the fluid into the wellbore; allowing the first chemical component to be released by the first downhole trigger.

The delivery of the first chemical component and/or the second chemical component may be controlled or sustained over time. The first downhole trigger and the second downhole trigger may be identical. The first type of solid particulate materials may contain also second chemical component and second type of solid particulate materials may contain also the first chemical component.

In another embodiment, the method may further include a third type of solid particulate materials. The first or second chemical components may be selected from breakers, anti-oxidants, crosslinkers, corrosion inhibitors, delay agents, biocides, buffers, fluid loss additives, pH control agents, solid acids, solid acid precursors, organic scale inhibitors, inorganic scale inhibitors, demulsifying agents, paraffin inhibitors, corrosion inhibitors, gas hydrate inhibitors, asphaltene treating chemicals, foaming agents, surfactant, fluid loss agents, water blocking agents, EOR enhancing agents and combinations thereof. The third type of solid particulate materials may contain the first chemical component, a second chemical component, the second chemical component, or a third chemical component.

The third chemical component may be selected from breakers, anti-oxidants, crosslinkers, corrosion inhibitors, delay agents, biocides, buffers, fluid loss additives, pH control agents, solid acids, solid acid precursors, organic scale inhibitors, inorganic scale inhibitors, demulsifying agents, paraffin inhibitors, corrosion inhibitors, gas hydrate inhibitors, asphaltene treating chemicals, foaming agents, surfactant, fluid loss agents, water blocking agents, EOR enhancing agents and combinations thereof.

Still in another aspect of the invention, a method of delivering a first chemical component to a subterranean formation in a wellbore is disclosed. The method includes: —providing a fluid comprising a carrier fluid and at least three different sizes of solid particulate materials selected from: (i) very large particles having a particle size greater than 1 mm; (ii) large particles having a particle size of from about 200-800 µm; (iii) medium particles having a particle size of from about 10-20 µm; (iv) fine particles having a particle size of from about 0.5-10 µm; (v) very fine particles having a particle size of from about 0.05-0.5 µm, and (vi) ultrafine particles having a particle size of from about 7-50 nm, wherein the packed volume fraction (PVF) of the three sizes of solid particulate materials exceeds 0.80, and wherein first type of solid particulate materials contains the first chemical component able to be released by a first downhole trigger, the second type of solid particulate materials contains the first chemical component or a second chemical component able to be released by a second downhole trigger, and the third type of solid particulate materials contains the first chemical component, a or the second chemical, or a third chemical component able to be released by a third downhole trigger; pumping the fluid into the wellbore; allowing the first chemical component to be released by the first downhole trigger.

The delivery of the first chemical component and/or the second chemical component and/or the third component may be controlled or sustained over time. The first downhole trigger and the second downhole trigger may be identical. Also, the second downhole trigger and the third downhole trigger may be identical.

DETAILED DESCRIPTION

At the outset, it should be noted that in the development of any actual embodiments, numerous implementation-specific decisions must be made to achieve the developer's specific goals, such as compliance with system- and business-related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the embodiments of the invention and should not be construed as a limitation to the scope and applicability of the invention. While the compositions of the invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

An "organic compound" as used herein refers to compounds of, containing or relating to carbon, and in some cases, carbon compounds that are or are potentially active in biological systems.

The carrier fluid may be water, an aqueous composition, brine, and/or may include a brine. Additionally, the carrier fluid can have a low amount of a viscosifier. As such, the carrier fluid may include any base fracturing fluid understood in the art. Some non-limiting examples of carrier fluids include hydratable gels (e.g. guars, poly-saccharides, xanthan, hydroxy-ethyl-cellulose, etc.), a cross-linked hydratable gel, a viscosified acid (e.g. gel-based), an emulsified acid (e.g. oil outer phase), an energized fluid (e.g. an $N_2$ or $CO_2$ based foam), and an oil-based fluid including a gelled, foamed, or otherwise viscosified oil. In another embodiment, the carrier fluid may be an acid. The carrier fluid may include hydrochloric acid, hydrofluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and/or a salt of any acid. In certain embodiments, the carrier fluid includes a poly-amino-poly-carboxylic acid, and is a trisodium hydroxyl-ethyl-ethylene-diamine triacetate, mono-ammonium salts of hydroxyl-ethyl-ethylene-diamine triacetate, and/or mono-sodium salts of hydroxyl-ethyl-ethylene-diamine tetra-acetate. The selection of any acid as a carrier fluid depends upon the purpose of the acid—for example formation etching, damage cleanup, removal of acid-reactive particles, etc.

The viscosifier may be a viscoelastic surfactant. Viscoelastic surfactant fluid systems (such as cationic, amphoteric, anionic, nonionic, mixed, and zwitterionic viscoelastic surfactant fluid systems, especially betaine zwitterionic viscoelastic surfactant fluid systems or amidoamine oxide surfactant fluid systems) suitable for the invention are those described in U.S. Pat. Nos. 5,551,516; 5,964,295; 5,979,555; 5,979,557; 6,140,277; 6,258,859 and 6,509,301, all hereby incorporated by reference thereto. In general, suitable zwitterionic surfactants have the formula:

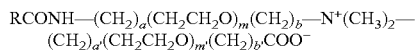

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and $CH_2CH_2O$ may also be oriented as $OCH_2CH_2$. In one embodiment, surfactants are betaines.

Two examples of commercially available betaine concentrates are, respectively, BET-O-30 and BET-E-40. The VES surfactant in BET-O-30 is oleylamidopropyl betaine. It is designated BET-O-30 because as obtained from the supplier (Rhodia, Inc. Cranbury, N.J., U.S.A.) it is called Mirataine BET-O-30; it contains an oleyl acid amide group (including a $C_{17}H_{33}$ alkene tail group) and is supplied as about 30% active surfactant; the remainder is substantially water, sodium chloride, glycerol and propane-1,2-diol. An analogous suitable material, BET-E-40, one chemical name is erucylamidopropyl betaine. BET surfactants, and others that are suitable, are described in U.S. Pat. No. 6,258,859. Certain co-surfactants may be useful in extending the brine tolerance, to increase the gel strength, and to reduce the shear sensitivity of VES fluids, in particular for BET-O-type surfactants. An example given in U.S. Pat. No. 6,258,859 is sodium dodecylbenzene sulfonate (SDBS). VES's may be used with or without this type of co-surfactant, for example those having a SDBS-like structure having a saturated or unsaturated, branched or straight-chained $C_6$ to $C_{16}$ chain; further examples of this type of co-surfactant are those having a saturated or unsaturated, branched or straight-chained $C_8$ to $C_{16}$ chain. Other suitable examples of this type of co-surfactant, especially for BET-O-30, are certain chelating agents such as trisodium hydroxyethylethylenediamine triacetate.

Other embodiments of effective water-soluble polymers include polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, other galactomannans, heteropolysaccharides obtained by the fermentation of starch-derived sugar (e.g., xanthan gum), and ammonium and alkali metal salts thereof. Cellulose derivatives are also used in an embodiment, such as hydroxyethylcellulose (HEC) or hydroxypropylcellulose (HPC), carboxymethylhydroxyethylcellulose (CMHEC) and carboxymethycellulose (CMC), with or without crosslinkers. Xanthan, diutan, and scleroglucan, three biopolymers, have been shown to have excellent proppant-suspension ability even though they are more expensive than guar derivatives and therefore have been used less frequently unless they can be used at lower concentrations.

Linear (not cross-linked) polymer systems can be used in another embodiment, but generally require more polymer for the same level of viscosification. All crosslinked polymer systems may be used, including for example delayed, optimized for high temperature, optimized for use with sea water, buffered at various pH's, and optimized for low temperature.

Any crosslinker may be used, for example boron, titanium, aluminum and zirconium. Suitable boron crosslinked polymers systems include by non-limiting example, guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines, and carboxylates such as acetates and oxalates) and with delay agents such as sorbitol, aldehydes, and sodium gluconate. Suitable zirconium crosslinked polymer systems include by non-limiting example, those crosslinked by zirconium lactates (for example sodium zirconium lactate), triethanolamines, 2,2'-iminodiethanol, and with mixtures of these ligands, including when adjusted with bicarbonate. Suitable titanates include by non-limiting example, lactates and triethanolamines, and mixtures, for example delayed with hydroxyacetic acid. Any other chemical additives can be used or included provided that they are tested for compatibility with the fibers and fiber degradation products of the invention (neither the fibers or their degradation products or the chemicals in the fluids interfere with the efficacy of one another or with fluids that might be encountered during the job, like connate water or flushes). For example, some of the standard crosslinkers or polymers as concentrates usually contain materials such as isopropanol, n-propanol, methanol or diesel oil.

The carrier fluid further includes a first type of particulates having a particle size selected from a group consisting of: (i) very large particles having a particle size greater than 1 mm; (ii) large particles having a particle size of from about 200-800 µm; (iii) medium particles having a particle size of from about 10-20 µm; (iv) fine particles having a particle size of from about 0.5-10 µm; (v) very fine particles having a particle size of from about 0.05-0.5 µm, and (vi) ultrafine particles having a particle size of from about 7-50 nm. The carrier fluid further includes a second type of particulates having particle size selected from a group consisting of: (i) very large particles having a particle size greater than 1 mm; (ii) large particles having a particle size of from about 200-800 µm; (iii) medium particles having a particle size of from about 10-20 µm; (iv) fine particles having a particle size of from about 0.5-10 µm; (v) very fine particles having a particle size of from about 0.05-0.5 µm, and (vi) ultrafine particles having a particle size of from about 7-50 nm. The second type has a particle size selected from a group different from the first type.

The selection of the size of the second type of particulates is dependent upon maximizing a packed volume fraction (PVF) of the mixture of the first and second type of particulates. A second particle size between about seven to ten times smaller than the first type of particulates contributes to maximizing the PVF of the mixture, but a size between about three to ten times smaller, and in certain embodiments between about three to fifteen times smaller, will provide a sufficient PVF for most systems. Further, the selection of the size of the second type of particulates is dependent upon the composition and commercial availability of particulates of the type comprising the second type of particulates. For example, where the second type of particulates comprise wax beads, a second average particle size of four times (4×) smaller than the first average particle size rather than seven times (7×) smaller than the first average particle size may be used if the 4× embodiment is cheaper or more readily available and the PVF of the mixture is still sufficient to acceptably suspend the particulates in the carrier fluid.

In a first embodiment, the first type of solid particulate materials contains a treating component and the second type of solid particulate materials contains a first chemical component.

In a second embodiment, the first type of solid particulate materials contains a first chemical component and the second type of solid particulate materials contains a second chemical component.

In a third embodiment, the first and second type of solid particulate materials contains a treating component and a first chemical component. In this third embodiment, both treating and chemical components are made of two different types of solid particulate materials.

In a fourth embodiment, the first and second type of solid particulate materials contains a first and a second chemical component. In this fourth embodiment, both chemical components are made of two different types of solid particulate materials.

In a further embodiment, the carrier fluid may include a third type of particulates having particle size selected from: (i) very large particles having a particle size greater than 1 mm; (ii) large particles having a particle size of from about 200-800 µm; (iii) medium particles having a particle size of from about 10-20 µm; (iv) fine particles having a particle size of from about 0.5-10 µm; (v) very fine particles having a particle size of from about 0.05-0.5 µm, and (vi) ultrafine particles having a particle size of from about 7-50 nm. The third type has a particle size selected from a group different from the first type and the second type. Still in another embodiment, the carrier fluid may include a fourth type of particulates having a particle size selected from a group different from the first, second and third type.

The third type of solid particulate materials may contain the treating component, the first chemical component, the second chemical component or a third chemical component. The fourth type of solid particulate material may contain the treating component, the first chemical component, the second chemical component, the third chemical component or a fourth chemical component.

Still in a further embodiment, the carrier fluid may include other types of particulates having particle size selected from a different group or similar group as described above. Other type of particulates may be treating component or chemical component.

For the purposes of enhancing the PVF of the fluid, more than three or four particles sizes will not typically be required. For example, a four-particle blend including 217 g of 20/40 mesh sand, 16 g or poly-lactic acid particles with an average size of 150 microns, 24 g of poly-lactic acid particles with an average size of 8 microns, and 53 g of $CaCO_3$ particles with an average size of 5 microns creates a particulate blend having a PVF of about 0.863. In a second example, a three-particle blend wherein each particle size is 7x to 10x smaller than the next larger particle size creates a particulate blend having a PVF of about 0.95. However, additional particles may be added for other reasons, such as the chemical composition of the additional particles, the ease of manufacturing certain materials into the same particles versus into separate particles, the commercial availability of particles having certain properties, and other reasons understood in the art.

In certain embodiments, the treating component is a proppant, for example sand, ceramic, or other particles understood in the art to at least partially hold open a fracture after a fracturing job is completed. In certain embodiments, the treating component may be a fluid loss agent, for example calcium carbonate particles or other fluid loss agents known in the art.

Gravel is also a natural or synthetic material, which may be identical to, or different from, proppant. Gravel packing is used for "sand" control. Sand is the name given to any particulate material from the formation, such as clays, that could be carried into production equipment. Gravel packing is a sand-control method used to prevent production of formation sand, in which, for example a steel screen is placed in the wellbore and the surrounding annulus is packed with prepared gravel of a specific size designed to prevent the passage of formation sand that could foul subterranean or surface equipment and reduce flows. The primary objective of gravel packing is to stabilize the formation while causing minimal impairment to well productivity. Sometimes gravel packing is done without a screen. High permeability formations are frequently poorly consolidated, so that sand control is needed; they may also be damaged, so that fracturing is also needed. Therefore, hydraulic fracturing treatments in which short, wide fractures are wanted are often combined in a single continuous ("frac and pack") operation with gravel packing For simplicity, in the following we may refer to any one of hydraulic fracturing, fracturing and gravel packing in one operation (frac and pack), or gravel packing, and mean them all.

Any conventional proppant (gravel) can be used. Such proppants (gravels) can be natural or synthetic (including but not limited to glass beads, ceramic beads, sand, and bauxite), coated, or contain chemicals; more than one can be used sequentially or in mixtures of different sizes or different materials. The proppant may be resin coated, pre-cured resin coated, provided that the resin and any other chemicals that might be released from the coating or come in contact with the other chemicals of the Invention are compatible with them. Proppants and gravels in the same or different wells or treatments can be the same material and/or the same size as one another and the term "proppant" is intended to include gravel in this discussion. In general the proppant used will have an average particle size of from about 0.15 mm to about 2.39 mm (about 8 to about 100 U.S. mesh), more particularly, but not limited to 0.25 to 0.43 mm (40/60 mesh), 0.43 to 0.84 mm (20/40 mesh), 0.84 to 1.19 mm (16/20), 0.84 to 1.68 mm (12/20 mesh) and 0.84 to 2.39 mm (8/20 mesh) sized materials. Normally the proppant will be present in the slurry in a concentration of from about 0.12 to about 0.96 kg/L, or from about 0.12 to about 0.72 kg/L, or from about 0.12 to about 0.54 kg/L. The viscosified proppant slurry can be designed for either homogeneous or heterogeneous proppant placement in the fracture, as known in the art.

The chemical component may be any type of material: breakers, anti-oxidants, crosslinkers, corrosion inhibitors, delay agents, biocides, buffers, fluid loss additives, pH control agents, solid acids, solid acid precursors, organic scale inhibitors, inorganic scale inhibitors, demulsifying agents, paraffin inhibitors, corrosion inhibitors, gas hydrate inhibitors, asphaltene treating chemicals, foaming agents, surfactant, fluid loss agents, water blocking agents, EOR enhancing agents, or the like. The chemical component may also be a biological agent. For comprehension, biological agents are to be considered as a subclass of chemical components. If the chemical component is in liquid form, encapsulation or adsorption on porous media is possible. For example, active chemical can be adsorbed to the surface of solid particles. Such additives can include, but are not limited to etc.

The wellbores treated can be vertical, deviated or horizontal. They can be completed with casing and perforations or open hole. The invention further may provide for controlled or sustained release of chemicals in adequate abundance during well treatments (e.g., fracturing, matrix acidizing, and acid fracturing), gravel packs, tubular, and hydraulic fracturing services to ensure more uniform, continuous longer-term delivery of chemicals to inhibit materials impacting performance in formations, well-bores, and piping. Typical materials that impact performance are water, brine, completion fluids, organic scales (e.g., asphaltenes, waxes, paraffin, and gas hydrates) and inorganic scales (e.g., sulfates and/or carbonates of calcium, barium, strontium, and radium).

Examples of applications covered by this invention include but are not limited to a controlled or sustained delivery and release of fluorinated surfactants in reservoirs with gas condensates to avoid production blockage. As well, controlled or sustained delivery and release of chemical agents to prevent water blocking and/or control water production, to aid in the lift of water in gas wells, to aid in control, prevention, remediation of emulsions, Controlled or sustained delivery and release of chemical agents to enhance EOR may be possible by various way: the injected chemical component is released from the fracture network into the matrix with limited dispersion within the bank of formation brine (control of leak-off to matrix), modification of formation wettability, modification of fluid rheological properties, or modification of pH, ionic character, and zeta potential.

Controlled or sustained delivery and release of production chemicals may be made: hydrates-$H_2S$-Bacteria-Corrosion-Scale (Inorganic and Organic), bio-agents such as bacteriocides, enzymes, microbial. The produced fluid is treated as it is produced through the fracture, sand face, and/or well bore.

Controlled or sustained release of energy stored within or transported by the particle or separated phase may be possible: for example, stored energy in super expanding cement/materials for stress diversion, imploding proppant for stress release in tight shale gas which will allow for naturally occurring stresses due the controlled decrease pressure within the fracture, imploding proppant for fracture profiling (link proppant to information) due to the shock wave propagation.

Other types of controlled or sustained delivery and release of chemical agents may be made: for maintaining the health of the reservoir, for mudcake dissolution and proppant/gavel pack clean-up, for minimizing the erosive properties of particles that flowback from the fracture during production, and thus minimizing the risk of damage to downhole screens and valves, for enhance heavy oil recovery which is used in conjunction with steam injection, for remediation of sustained casing pressure. Controlled placement of particles and release to enable optimized production of methane hydrates when production is desired can be made as well.

By way of examples, a list of chemical components that may be used is provided herewith. A large variety of scale inhibitors are available commercially. Most of the commercialized scale inhibitors contain several reactive groups (carboxylate and/or phosphonate) which are capable of interacting with polyvalent metal ions to prevent scale deposits. Examples of inhibitors include a polycarboxylate, (homo or copolymer of an ethylenically unsaturated acid monomer such as acrylic acid, methacrylic acid, maleic acid, itaconic acid, fumaric acid, mesoconic acid, citraconic acid and the like), monoesters of diacids with alkanols, e.g., having 1-8 carbon atoms, and mixtures thereof. Monomeric and polymeric phosphonates, e.g., aminomethylenephosphonates and homopolymers and copolymers of vinylphosphonate. Another class of inhibitors which may be used in practicing the method of this invention are organic phosphate esters such as phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine.

Exemplary of the demulsifying agents that are useful include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of the such di-functional products. In one embodiment, non-ionic demulsifiers are oxyalkylated phenol formaldehyde resins, oxyalkylated amines and polyamines, diepoxidized oxyalkylated polyethers, etc. Suitable oil-in-water demulsifiers include poly triethanolamine methyl chloride quaternary, melamine acid colloid, aminomethylated polyacrylamide etc.

Paraffin inhibitors useful for the practice of the embodiment include, but are not limited to, ethylene/vinyl acetate copolymers, acrylates (such as polyacrylate esters and methacrylate esters of fatty alcohols), and olefin/maleic esters.

Exemplary corrosion inhibitors useful for the practice of the invention include but are not limited to fatty imidazolines, alkyl pyridines, alkyl pyridine quaternaries, fatty amine quaternaries and phosphate salts of fatty imidazolines.

Gas hydrate treating chemicals or inhibitors that are useful for the practice of the embodiment include but are not limited to polymers and homopolymers and copolymers of vinyl pyrrolidone, vinyl caprolactam.

Exemplary asphaltene treating chemicals include but are not limited to fatty ester homopolymers and copolymers (such as fatty esters of acrylic and methacrylic acid polymers and copolymers) and sorbitan monooleate.

Suitable foaming agents include, but are not limited to, oxyalkylated sulfates or ethoxylated alcohol sulfates, or mixtures thereof.

In one embodiment, a method includes providing a carrier fluid having a low amount of a viscosifier, providing a particulate blend including a first type of particulates of proppant having a first average particle size between about 100 and 2000 μm and a second type of particulates of chemical component having a second average particle size between about three and fifteen times smaller than the first average particle size, such that a packed volume fraction (PVF) of the particulate blend exceeds 0.80. The method further includes combining the carrier fluid and the particulate blend into a fracturing slurry, fracturing a formation of interest with the fracturing slurry, and allowing the second type of particulates from the propped fracture to release the chemical component by a downhole trigger.

In certain further embodiments, the method includes the second type of particulates being made of production chemicals (inorganic and organic scale inhibitors, gas hydrate inhibitors), health maintenance chemicals (filter cake remover, fracture maintenance). In certain further embodiments, the second type of particulates includes a reactive compound that reacts with at least one of the downhole trigger to release better the chemical component. In certain embodiments, the particulate blend further includes a third type of particulates having a third average particulate size that is smaller than the second average particulate size.

In an exemplary embodiment, a system includes a wellbore in fluid communication with a formation of interest, a fracturing slurry including a carrier fluid having a low amount of a viscosifier, a first type of a particulates of proppant including a first average particle size between about 100 and about 2000 μm, a second type of particulates of chemical component having a second average particle size between about three and ten times smaller than the first average particle size, a pumping device structured to create a fracture in the formation of interest with the fracturing slurry; and the chemical component structured to release its components in the well under a downhole trigger.

The downhole trigger according to the invention can be a chemical, a physical or a mechanical trigger. The chemical trigger can be a trigger component: contact of the chemical component with the trigger component allows release of the chemical component. The trigger component can be oil, water, hydrate, $H_2S$, $CO_2$. The chemical trigger can be a change in the pH, the gradient of concentration, e.g. salinity. The physical trigger can be a change in a physical parameter downhole, e.g. temperature, pressure, resistivity, conductivity. As well the physical trigger can be an optic, electrical or magnetic pulse. The mechanical trigger can be an acoustic wave, a seismic event.

While the invention has been described in detail in foregoing description, the same is to be considered as illustrative and not restrictive in character, it being understood that only the embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of treating a subterranean formation penetrated by a wellbore, the method comprising:
   a) providing a fluid comprising a carrier fluid and at least two different sizes of solid particulate materials selected from a group consisting of:
      (i) very large particles having a particle size greater than 1 mm;
      (ii) large particles having a particle size of from about 200-800 µm;
      (iii) medium particles having a particle size of from about 10-20 µm;
      (iv) fine particles having a particle size of from about 0.5-10 µm;
      (v) very fine particles having a particle size of from about 0.05-0.5 µm; and
      (vi) ultrafine particles having a particle size of from about 7-50 nm;
   wherein the packed volume fraction (PVF) of the two sizes of solid particulate materials exceeds 0.80, and wherein a first type of solid particulate materials comprises a first treating component, and a second type of solid particulate materials comprises a first chemical component able to be released by a first downhole trigger;
   b) pumping the fluid into the wellbore to treat the formation; and,
   c) allowing the first chemical component to be released by the downhole trigger.

2. The method of claim 1, wherein the carrier fluid has a low amount of a viscosifier.

3. The method of claim 2, further comprising the step of fracturing the formation with the carrier fluid.

4. The method of claim 1, further comprising a third type of solid particulate materials.

5. The method of claim 4, wherein the third type of solid particulate materials comprise at least one of the first treating component, a second treating component, the first chemical component, or a second chemical component.

6. The method of claim 5, wherein the second treating component is selected from the group consisting of proppant, fluid loss agent, and combinations thereof.

7. The method of claim 5, wherein the second chemical component is selected from the group consisting of breakers, anti-oxidants, crosslinkers, corrosion inhibitors, delay agents, biocides, buffers, fluid loss additives, pH control agents, solid acids, solid acid precursors, organic scale inhibitors, inorganic scale inhibitors, demulsifying agents, paraffin inhibitors, corrosion inhibitors, gas hydrate inhibitors, asphaltene treating chemicals, foaming agents, surfactant, fluid loss agents, water blocking agents, EOR enhancing agents and combinations thereof.

8. The method of claim 5, wherein the second chemical component may be released by a second downhole trigger.

9. The method of claim 1, wherein the first treating component is selected from the group consisting of proppant, fluid loss agent, and combinations thereof.

10. The method of claim 1, wherein the first chemical component is selected from the group consisting of breakers, anti-oxidants, crosslinkers, corrosion inhibitors, delay agents, biocides, buffers, fluid loss additives, pH control agents, solid acids, solid acid precursors, organic scale inhibitors, inorganic scale inhibitors, demulsifying agents, paraffin inhibitors, corrosion inhibitors, gas hydrate inhibitors, asphaltene treating chemicals, foaming agents, surfactant, fluid loss agents, water blocking agents, EOR enhancing agents, and combinations thereof.

11. A method of delivering a first chemical component to a subterranean formation penetrated by a wellbore comprising:
   a) providing a fluid comprising a carrier fluid and at least two different sizes of solid particulate materials selected from a group consisting of:
      (i) very large particles having a particle size greater than 1 mm;
      (ii) large particles having a particle size of from about 200-800 µm;
      (iii) medium particles having a particle size of from about 10-20 µm;
      (iv) fine particles having a particle size of from about 0.5-10 µm;
      (v) very fine particles having a particle size of from about 0.05-0.5 µm; and
      (vi) ultrafine particles having a particle size of from about 7-50 nm;
   wherein the packed volume fraction (PVF) of the two sizes of solid particulate materials exceeds 0.80, and wherein a first type of solid particulate materials comprises a first chemical component able to be released by a first downhole trigger, and a second type of solid particulate materials contains the first chemical component or a second chemical component able to be released by a second downhole trigger;
   b) pumping the fluid into the wellbore; and
   c) allowing the first chemical component to be released by the first downhole trigger.

12. The method of claim 11, further comprising a third type of solid particulate material.

13. The method of claim 12, wherein the third type of solid particulate material comprises at least one of the first chemical component, a second chemical component, the second chemical component, or a third chemical component.

14. The method of claim 13, wherein the third chemical component is selected from the group consisting of breakers, anti-oxidants, crosslinkers, corrosion inhibitors, delay agents, biocides, buffers, fluid loss additives, pH control agents, solid acids, solid acid precursors, organic scale inhibitors, inorganic scale inhibitors, demulsifying agents, paraffin inhibitors, corrosion inhibitors, gas hydrate inhibitors, asphaltene treating chemicals, foaming agents, surfactant, fluid loss agents, water blocking agents, EOR enhancing agents, and combinations thereof.

15. The method of claim 11, wherein the delivery of the first chemical component and/or the second chemical component is controlled.

16. The method of claim 11, wherein the delivery of the first chemical component and/or the second chemical component is sustained over time.

17. The method of claim 11, wherein the first downhole trigger and the second downhole trigger are identical.

18. The method of claim 11, wherein the first type of solid particulate material also comprises the second chemical component, and the second type of solid particulate material also comprises the first chemical component.

19. The method of claim 11, wherein the first or second chemical components are selected from the group consisting of breakers, anti-oxidants, crosslinkers, corrosion inhibitors, delay agents, biocides, buffers, fluid loss additives, pH control agents, solid acids, solid acid precursors, organic scale inhibitors, inorganic scale inhibitors, demulsifying agents, paraffin inhibitors, corrosion inhibitors, gas hydrate inhibitors, asphaltene treating chemicals, foaming agents, surfactant, fluid loss agents, water blocking agents, EOR enhancing agents, and combinations thereof.

20. A method of delivering a first chemical component to a subterranean formation penetrated by a wellbore, the method comprising:
  a) providing a fluid comprising a carrier fluid and at least three different sizes of solid particulate materials selected from a group consisting of:
    (i) very large particles having a particle size greater than 1 mm;
    (ii) large particles having a particle size of from about 200-800 μm;
    (iii) medium particles having a particle size of from about 10-20 μm;
    (iv) fine particles having a particle size of from about 0.5-10 μm;
    (v) very fine particles having a particle size of from about 0.05-0.5 μm; and
    (vi) ultrafine particles having a particle size of from about 7-50 nm'
  wherein the packed volume fraction (PVF) of the three sizes of solid particulate materials exceeds 0.80, and wherein a first type of solid particulate material comprises a first chemical component able to be released by a first downhole trigger, a second type of solid particulate materials comprises the first chemical component or a second chemical component able to be released by a second downhole trigger, and a third type of solid particulate materials comprises the first chemical component, or the second chemical, or a third chemical component able to be released by a third downhole trigger;
  b) pumping the fluid into the wellbore; and,
  c) allowing the first chemical component to be released by the first downhole trigger.

21. The method of claim 20, wherein the delivery of the first chemical component and/or the second chemical component and/or the third component is controlled.

22. The method of claim 20, wherein the delivery of the first chemical component and/or the second chemical component and/or the third component is sustained over time.

23. The method of claim 20, wherein the first downhole trigger and the second downhole trigger are identical.

24. The method of claim 20, wherein the second downhole trigger and the third downhole trigger are identical.

* * * * *